(12) United States Patent
Huang

(10) Patent No.: US 6,315,313 B1
(45) Date of Patent: Nov. 13, 2001

(54) ENERGY STORING BICYCLE

(76) Inventor: C. Y. Huang, No. @, Lane 24, Yangteh Ave., Sec. 1, Taipei (TW)

( * ) Notice: Subject to any disclaimer, the term of this patent is extended or adjusted under 35 U.S.C. 154(b) by 0 days.

(21) Appl. No.: 09/571,598

(22) Filed: May 15, 2000

(51) Int. Cl.[7] .............................. B62M 1/10; B62M 1/04; B62M 1/00
(52) U.S. Cl. .......................... 280/216; 280/252; 280/253
(58) Field of Search ................................... 280/216, 215, 280/252, 253

(56) References Cited

U.S. PATENT DOCUMENTS 5,527,246 * 6/1996 Rodgers, Jr. .......................... 280/253
6,173,981 * 1/2001 Coleman .............................. 280/253

* cited by examiner

Primary Examiner—Brian L. Johnson
Assistant Examiner—Matthew Luby
(74) Attorney, Agent, or Firm—Dougherty & Troxell

(57) ABSTRACT

Energy storing bicycle comprises: a fluid reservoir accommodating a fluid having a predetermined viscosity compressible for storing pressure energy, to which at least one supply pipe and at least one return pipe are connected; at least one pressure pump whose inlet being connected to the supply pipe, after being compressed, the fluid in the pump is pressurized to a certain pressure and deliver the high pressure fluid out of the exit of the pump; pressure reserving cylinders with the same units as that of the pressure pumps each with an inlet connected to the pressure pipe; the cylinder being able to reserve pressurized fluid with an exit connected to a transmission pipe and having a gate valve so as to control the high pressure fluid to be able to continuously output therefrom for a long time; fluid turbines with the same units as that of the pressure reserving cylinders each with an inlet connected to the transmission pipe, and having a turbine rotor driven by highly pressurized fluid, an exit thereof being connected to the return pipe for the fluid reservoir; and a bicycle frame to mount the above described mechanisms thereon, at least one hub of the bicycle wheel is conjoined to the shaft of the turbine rotor.

6 Claims, 2 Drawing Sheets

ENERGY STORING BICYCLE

BACKGROUND OF THE INVENTION

1. Field of the Invention

The present invention relates to energy storing bicycle, and more particularly, to a bicycle driven using stored energy in a high pressure fluid.

2. Description of the Prior Art

Among all kinds of vehicles, a bicycle is the most convenient and healthy one since it is light in weight, economical, easy to drive, and no environmental contamination due to exhaust gas. As a matter of fact, the bicycle is really recommended by many countries as the worthiest traffic means present day in the world.

In a bicycle, the driving power is transmitted sequentially from pedals, combination of gear chain and sprockets to the real wheel. Such a power transmission system has not been innovated since the time bicycle appeared in the world. Should some improving ideas be added to such a basic power transmission system, it would make the bicycle more attractive and amusing.

In order to realize the above mentioned ideas, the present inventor carried out theoretical studies and simulating experiments. Based on these studies and researches, the present inventors came to propose the present invention.

SUMMARY OF THE INVENTION

Therefore, it is a main object of the present invention to provide a more convenient and amusing bicycle equipped with a fluid mechanism prestoring energy of pressurized fluid therein, and is able to gradually deliver the energy which is then converted to dynamic force to drive the wheels of a bicycle such that the bicycle will move on without the need of a rider to pedal along.

For fuller understanding of the nature and the object of the present invention, reference should be made to the following detailed description taken in conjunction with the accompanying drawings.

DETAILED DESCRIPTION OF THE PREFERRED EMBODIMENT

Figure 1:
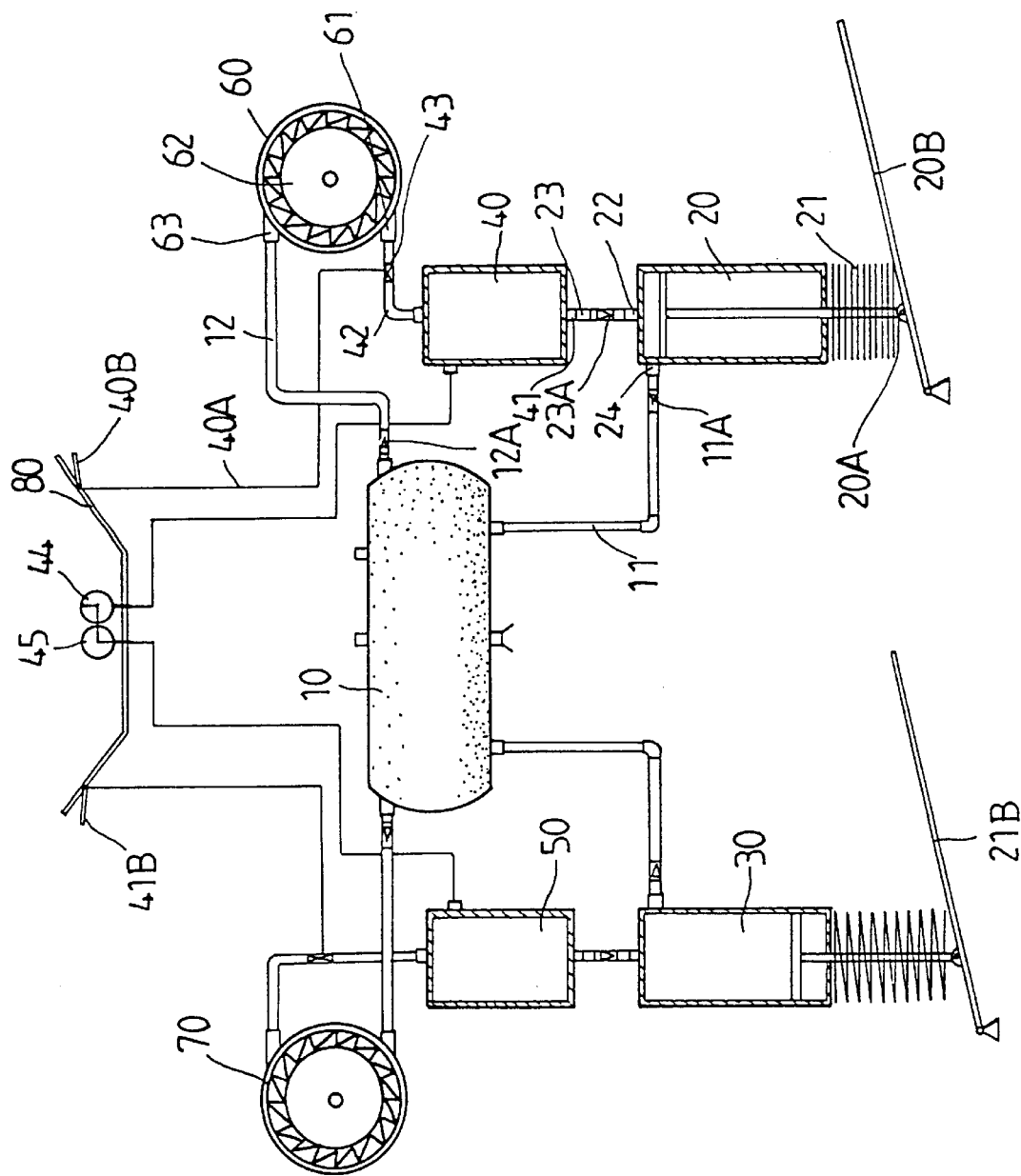
FIG. 1 is a drawing showing the dynamic system of energy storing bicycle according to the present invention.

As shown in FIG. 1, the dynamic system of energy storing bicycle according to the present invention comprises a fluid reservoir 10, a pair of pressure pumps 20, 30, a pair of pressure reserving cylinders 40, 50, and a pair of fluid turbines 60, 70. The pressure pumps 20, 30, the pressure reserving cylinders 40, 50, and the fluid turbines 60, 70 are divided into identical twin groups to conjoin with the common fluid reservoir 10. Hereinafter, the operational principle of one of the groups consisting of the pressure pump 20, the pressure reserving cylinder 40, and fluid turbine 60 will be exemplarily illustrated.

A fluid having a certain viscosity compressible for storing pressure energy (normally a dynamic oil) is accommodated in the fluid reservoir 10 to which at least one supply pipe 11 and at least one return pipe 12 are connected. The supply pipe 11 is connected to an inlet 24 of the pressure pump 20 with a first one way valve 11A installed thereinbefore so as to allow the flow direction of the fluid only one way from the fluid reservoir 10 to the pressure pump 20 through the inlet 24. An exit 22 of the pressure pump 20 is connected to an inlet 41 of the pressure reserving cylinder 40 with a pressure pipe 23 in which a second one way valve 23A is installed so as to open when the fluid pressure is higher than a predetermined value and let the fluid flow from the pressure pump 20 therethrough into the pressure reserving cylinder 40. At a normal state, the pressure pump 20 is full of fluid. As soon as a lever end 20A of the pressure pump 20 is urged, the fluid is pumped out of the fluid reservoir 10 into the pressure pump 20 via the supply pipe 11, and a high fluid pressure is produced in the pressure pump 20 during an urging stroke to overcome the control of the second one way valve 23A and flow out of the pressure pump 20 into the pressure reserving cylinder 40 via the pressure pipe 23. A multiplying lever 20B having a forcing, arm longer than a force resisting aim is conjoined to the lever end 20A of the pressure pump 20 so that a force conversion effect may be attained when urging the pressure pump 20 with the multiplying lever 20B. A restoring spring 21 is interposed between the lever end 20A and the pressure pump 20 so as to restore the lever end 20A to its initial position by a resilient force after operation.

The pressure reserving cylinder 40 is used to maintain a fluid and store pressurized fluid therein. A transmission pipe 42 is connected between an exit of the pressure reserving cylinder 40 and an inlet 61 of the fluid turbine 60 thereof A pressure gage 44 is provided for the pressure reserving cylinder 40 for measuring the pressure therein. A gate valve 43 is installed in the transmission pipe 42 for controlling, the fluid flow in the transmission pipe 42 such that the high pressurized fluid may continuously be supplied from the pressure reserving cylinder 40 into the fluid turbine 60 for a long time duration. There is a turbine rotor 62 installed in a hermetical housing of the fluid turbine 60 whose rotor shaft is conjoined with a hub of the bicycle wheel. When the high pressure fluid flows into the fluid turbine 60 to actuate the vanes of the rotor 62, the rotor 62 drives the bicycle wheel to move on. The return pipe 12 is connected to an exit 63 of the fluid turbine 60 for the fluid to return the fluid reservoir 10 therethrough. A third one way valve 12A installed in the return pipe 12 allows the low pressure fluid to egress from the exit 63 back into the fluid reservoir 10 therethrough. The gate valve 43 is connected to an actuating lever 40B installed on a handlebar 80 of the bicycle with a lead wire 40A such that the gate valve 43 may be opened by gripping the lever 40B. By so, the static energy stored in the pressurized fluid is converted into kinetic energy so as to drive the bicycle. As shown in the drawings, two units of dynamic mechanisms are equipped for one bicycle so that the front and the rear wheels of a bicycle are respectively driven by the fluid turbines 70 and 60.

Figure 2:
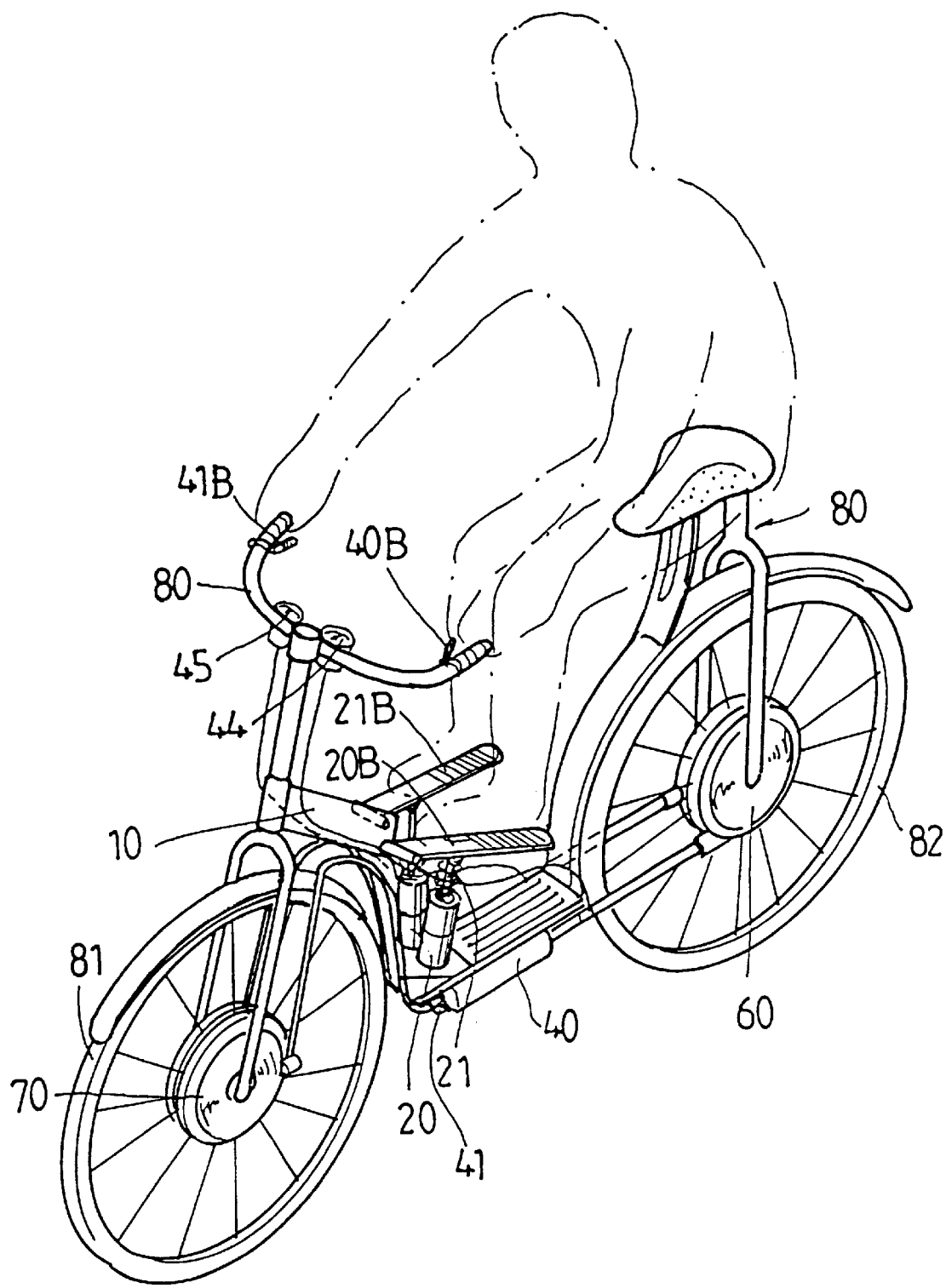
FIG. 2 is a drawing illustrating operational principle of energy storing bicycle according to the present invention.

Reference may be made to FIG. 2 for illustration of operational principle of the bicycle according to the present invention. The multiplying levers 20B and 21B of the pressure pumps 20 and 21 are respectively mounted on the leftside and the rightside pedals on the bicycle frame. Both pressure reserving cylinders 40 and 41 are attached to respectively mounted on the leftside and the rightside pedals on the bicycle frame. Both pressure reserving cylinders 40 and 41 are attached to the frame under the pedals. The hubs of the front and the rear wheels 81, 82 are respectively conjoined to the two rotor shafts of the fluid turbines 60, 70, whereas the corresponding actuating lever 40B, 41B are respectively installed at the leftside and rightside of the handlebar 80 together with pressure gages 44 and 45. The fluid reservoir 10 can be settled at an appropriate location on the bicycle frame.

With such construction, when the rider pedals alternatively the multiplying levers 20B and 21B, the energy is stored in the pressure reserving cylinders 40, 41. The stored static energy is converted to kinetic energy by gripping the actuating levers 40B and 41B. On the other hand, rider should watch the pressure gages 44, 45 from time to time to pay attention to remaining stored energy, if it is about to be used up, he/she has to stop moving by releasing the levers 40B, 41B, and instead, pedal alternatively the multiplying levers 20B, 21B so as to store energy.

An object of convenient, economical, amusing and contamination free energy storing bicycle of the present invention is attained as such.

Other embodiments of the present invention will become obvious to those skilled in the art in light of above disclosure. It is of course also understood that the scope of the present invention is not to be determined by the foregoing description, but only by the following claims.

What is claimed is:

1. Energy storing bicycle comprising:

a fluid reservoir accommodating a fluid having a predetermined viscosity compressible for storing pressure energy, to which at least one supply pipe and at least one return pipe are connected;

at least one pressure pump whose inlet being connected to said supply pipe, after being compressed, the fluid in said pump is pressurized to a certain pressure and the pressurized fluid is delivered from the exit to a pressure pipe;

pressure reserving cylinders with the same units as that of said pressure pumps for reserving the pressurized fluid therein, each with an inlet connected to said pressure pipe and an exit connected to a transmission pipe having a gate valve;

fluid turbines with the same units as that of said pressure reserving cylinders each with an inlet connected to said transmission pipe, and each with an outlet connected to said return pipe for said fluid reservoir, and having a turbine rotor to be driven by highly pressurized fluid; and a bicycle frame to mount the above described mechanisms thereon, at least one hub of the bicycle wheels is conjoined to one shaft of said turbine rotor.

2. The energy storing bicycle of claim 1, wherein a first one way valve is installed in said supply pipe for controlling the fluid to flow one way from said pressure reserving cylinder to said pressure pump, further, a second one way valve is installed in said pressure pipe for allowing only the fluid with a predetermined high pressure valve to flow one way from said pressure pump to said pressure reserving cylinder, further, a gate valve is installed in said transmission pipe for controlling the highly pressurized fluid to be continuously output from said pressure reserving cylinder into said fluid turbine, moreover, a third one wan, valve is installed in said return pipe for allowing the reduced pressure fluid egressed from said pressure turbine to flow one way into said fluid reservoir.

3. The energy storing bicycle of claim 1, wherein a multiplying lever whose forcing arm being longer than anti-forcing arm is connected to the lever end of said pressure pump, and a restoring spring is installed between said multiplying lever and said pressure pump.

4. The energy storing bicycle of claim 2, wherein said gate valve is connected to an actuating lever such that said gate valve can be opened by gripping said actuating lever.

5. The energy storing bicycle of claim 1, wherein a pressure gage is provided for said pressure reserving cylinder.

6. The energy storing bicycle of claim 2, wherein a multiplying lever whose forcing arm being longer than anti-forcing arm is connected to the lever end of said pressure pump, and a restoring spring is installed between said multiplying lever and said pressure pump.

\* \* \* \* \*